United States Patent
Huang

(10) Patent No.: US 11,533,180 B1
(45) Date of Patent: Dec. 20, 2022

(54) STORAGE DEVICE AND ELECTRONIC DEVICE

(71) Applicant: SHANGHAI HARVEST INTELLIGENCE TECHNOLOGY CO., LTD., Shanghai (CN)

(72) Inventor: Jiandong Huang, Shanghai (CN)

(*) Notice: Subject to any disclaimer, the term of this patent is extended or adjusted under 35 U.S.C. 154(b) by 63 days.

(21) Appl. No.: 16/886,763

(22) Filed: May 28, 2020

Related U.S. Application Data

(63) Continuation-in-part of application No. PCT/CN2018/087798, filed on May 22, 2018, and a
(Continued)

(30) Foreign Application Priority Data

Nov. 28, 2017 (CN) .......................... 201711217863.4
Nov. 28, 2017 (CN) .......................... 201711219057.0

(51) Int. Cl.
*H04L 9/32* (2006.01)
*H04L 9/08* (2006.01)
(Continued)

(52) U.S. Cl.
CPC .......... *H04L 9/3231* (2013.01); *H04L 9/0643* (2013.01); *H04L 9/0869* (2013.01); *H04L 9/30* (2013.01)

(58) Field of Classification Search
CPC ... H04L 9/3231; H04L 9/0643; H04L 9/0869; H04L 9/30
See application file for complete search history.

(56) References Cited

U.S. PATENT DOCUMENTS 10,142,333 B1 * 11/2018 Griffin .................... G06F 21/32
10,277,400 B1 * 4/2019 Griffin .................... H04L 9/14
(Continued)

FOREIGN PATENT DOCUMENTS

CN      102819700      12/2012
CN      104750354      7/2015
(Continued)

*Primary Examiner* — Yin Chen Shaw
*Assistant Examiner* — Alex D Carrasquillo

(57) ABSTRACT

Storage medium and electronic device are provided in the instant application. An executable computer program is stored in the storage medium. The executable computer program is executed by a processor, including: receive and store a default identification information in an electronic device. Receive an identification request and a to-be-authorized identification information collected by the electronic device. Receive the default identification information from the electronic device. Compare the to-be-authorized identification information with default identification information. if they are determined to be matched, the to-be-authorized identification information being true, otherwise the to-be-authorized identification information being false. When identification information is authenticated, the identification information can be collected real-time because the default identification information is stored in the electronic device in advance. Therefore, the operator of the electronic device is the registered user that can be ensure so that safety of verification can be improved effectively.

17 Claims, 14 Drawing Sheets

Related U.S. Application Data continuation-in-part of application No. PCT/CN2018/087812, filed on May 22, 2018.

(51) Int. Cl.
*H04L 9/06* (2006.01)
*H04L 9/30* (2006.01)

(56) References Cited

U.S. PATENT DOCUMENTS

| | | | | |
|---|---|---|---|---|
| 2009/0058598 | A1* | 3/2009 | Sanchez Sanchez | G06F 21/32 340/5.83 |
| 2013/0283057 | A1* | 10/2013 | Hama | G06V 10/7515 713/186 |
| 2013/0318361 | A1* | 11/2013 | Erickson | G06F 21/32 713/193 |
| 2014/0181959 | A1* | 6/2014 | Li | G06F 21/32 726/19 |
| 2015/0036893 | A1* | 2/2015 | Shinzaki | G06V 40/67 382/115 |
| 2016/0125240 | A1* | 5/2016 | Danikhno | H04W 12/02 348/78 |
| 2017/0300736 | A1* | 10/2017 | Song | G06V 40/1312 |
| 2018/0032712 | A1* | 2/2018 | Oh | G06Q 20/227 |
| 2018/0054312 | A1* | 2/2018 | Kamal | H04L 9/3247 |
| 2018/0069703 | A1* | 3/2018 | Chakraborty | H04L 9/3231 |
| 2018/0069854 | A1* | 3/2018 | Chakraborty | H04L 9/3231 |

FOREIGN PATENT DOCUMENTS

| | | | | |
|---|---|---|---|---|
| CN | 104778392 | 7/2015 | | |
| CN | 105117123 | 12/2015 | | |
| CN | 105320867 | 2/2016 | | |
| CN | 107256391 | 10/2017 | | |
| CN | 107358286 | 11/2017 | | |
| WO | WO-2007108397 | A1 * | 9/2007 | H04L 9/3231 |

* cited by examiner

STORAGE DEVICE AND ELECTRONIC DEVICE

BACKGROUND OF THE INVENTION

1. Field of the Invention

The present invention relates to safety certificate art, and more particularly to a storage medium and electronic device.

2. Description of the Prior Art

In the application of financial payment and physiological health monitoring, whose information security is strictly required, more rigorous identification and information encryption are general trend. Especially such applications that require extreme information security usually use cloud servers as the backstage computing platform. The cloud usually will authenticate legality of terminal to ensure the terminal device issuing physiological characteristics information is registered device. For example, in the application of financial payment, after user send a certification requirement to cloud platform, the cloud platform will send a security verification code to same or different terminal device and prompt user input the security verification code to improve security of the financial payment. However, said cloud security verification still cannot identify whether the operator of the terminal device is registered user himself. Although the legality of terminal device can be identified, the operator (i.e. legal user) of terminal device cannot be identified. There is a security risks.

SUMMARY OF THE INVENTION

To this end, it is necessary to provide an electronic device to solve the security risks problem which generated from that the current cloud server cannot authenticate the user operating the terminal device in the information verification process.

In order to achieve the above object, in the first embodiment of the present invention, the inventor provides a storage medium. An executable computer program is stored in the storage medium, and when the executable computer program is executed, the following steps are executed:

receiving and storing a default identification information in an electronic device;

receiving an identification request and a to-be-authorized identification information collected by the electronic device, receiving the default identification information from the electronic device, making a comparison of the to-be-authorized identification information with default identification information, if they are determined to be matched, the to-be-authorized identification information being true, otherwise the to-be-authorized identification information being false.

In some embodiment, the computer program is executed by a processor, and receiving and storing a default identification information in an electronic device further comprises:

receiving the default identification information collected by an external identification sensor, and writing the default identification information into a universal integrated circuit card of the electronic device, the external identification sensor is independent of the electronic device.

In some embodiment, the computer program executed by a processor, and receiving and storing a default identification information in an electronic device further comprises:

receiving the default identification information collected by the identification sensor of the electronic device, and writing the default identification information into a universal integrated circuit card of the electronic device.

In some embodiment, the default identification information is selected from a group consisting of: face information, fingerprint information, eyeball information, iris information, voice information, and blood volume information.

In some embodiment, the computer program is executed, and the storage medium further comprises:

converting the default identification information into a default identification information abstract via cryptographic hash function. The default identification information stored as the default identification information abstract in a universal integrated circuit card of the electronic device.

In some embodiment, an authentication key is stored in the electronic device and the authentication key comprises a public key, and the computer program is executed, the storage medium further comprises:

obtaining the public key, using encryption algorithm with the public key to encrypt the default identification information abstract and obtain a default encryption information, wherein the default encryption information has an encrypted default identification information abstract.

In some embodiment, the computer program is executed, and the storage medium further comprises:

converting the to-be-authorized identification information into a unknown identification information abstract via the cryptographic hash function after receiving the to-be-authorized identification information; and using an encryption algorithm with the public key to encrypt the to-be-authorized identification information abstract in order to obtain a to-be-authorized encryption information; wherein the to-be-authorized encryption information has the encrypted unknown identification information abstract.

In some embodiment, the authentication key further comprises a private key, and the computer program is executed, and the storage medium further comprises:

obtaining the private key, using a decryption algorithm corresponding to an encryption algorithm with the private key to decrypt a default encryption information and the to-be-authorized encryption information in order to obtain the default identification information abstract and the to-be-authorized identification information abstract, making a comparison of the default identification information abstract with the to-be-authorized identification information abstract, if they are determined to be matched, the identification being true, otherwise the identification being false.

In some embodiment, the computer program is executed, and the storage medium further comprises:

generating randomly a first random number character string and a first random filling space after receiving the default identification information, wherein the first random filling space is generated randomly and filled on the character string of the default identification information abstract, and the default encryption information has an encrypted first random number character string and an encrypted first random filling space;

generating randomly a second random number character string and a second random filling space after receiving the to-be-authorized identification information, and the second random filling space is produced by chance and is filled in the character string of the to-be-authorized identification information abstract;

obtaining the private key of the electronic device; using the encryption algorithm with the private key to decrypt the default encryption information in order to obtain the first random number character string and the first random filling space;

making a comparison of first random number character string with second random number character string, the first random filling space and the second random filling space, if they are determined to be matched, the identification being true, otherwise the identification being false.

In some embodiment, the computer program is executed, and the storage medium further comprises:

receiving an encryption level setting instruction to set a plurality of encryption levels of the electronic device, wherein the encryption level comprises a first encryption level, a second encryption level and a third encryption level;

when the electronic device is in first encryption level, a condition of the identification being true is that of three successful matches of the default identification information matching with the to-be-authorized identification information abstract, the first random number character string and the second random number character string, and the first random filling space and second random filling space;

when the electronic device is in second encryption level, a condition of successful identification is the successful matches of the default identification information and the to-be-authorized identification information abstract, and the successful matches of the first random number character string and the second random number character string or the first random filling space and second random filling space;

when the electronic device is in third encryption level, a condition of successful identification is the successful matches of the default identification information and the to-be-authorized identification information abstract.

In second embodiment of the present invention, applicant further provides an electronic device, the electronic comprises a main circuit board, a processor, a sensing element and the storage medium of claim 1, wherein the default identification information is stored in the main circuit board, the sensor is connected to the processor, the executable computer program is stored in the storage medium, and the processor is configured to execute the computer program.

In some embodiment, the sensing element is selected from a group consisting of: regular camera, infrared camera and microphone.

In some embodiment, an amount of the sensing element is plural, and the sensing elements collect different types of the default identification information, and the computer program is executed, further comprising:

receiving the different types of the default identification information collected by the sensing elements, converting the different types of the default identification information into the default identification information abstracts via a cryptographic hash function; or the sensing element is single, and the computer program is executed to perform the steps comprising:

receiving the different types of the default identification information from by the sensing element, converting the different types of the default identification information into the default identification information abstracts via the cryptographic hash function.

In some embodiment, the electronic device further comprises a display unit.

In some embodiment, the electronic device further comprises a flexible circuit board, which has a chip with an image signal reading identification function, wherein the display unit is connected to the main circuit board via the flexible circuit board.

In some embodiment, a universal integrated circuit card is disposed on the main circuit board.

In some embodiment, the display comprises a plurality of pixel array, assemblies, and the computer program is executed, the electronic device comprises:

coding the plurality of default pixel array assemblies on the display unit, and using the coded pixel array assemblies to irradiate a body part; and receiving an optical signal reflected from the body part to obtain the default identification information.

In some embodiment, the sensing element is a light detector, an identification area is disposed on the display unit, the light detector and the identification area are disposed correspondingly;

the light detector comprising a plurality of pixel detection area, a set of light detection film and a pixel film circuit, that is configured to transmit data and drive scanning and at least one set of the light detection film and the pixel film circuit and each of each pixel detection area being disposed correspondingly;

wherein the light detection film comprises an array formed by a plurality of photodiode or a plurality of phototransistors.

In some embodiment, the light detection film is an array formed by photodiodes, and the array formed by photodiodes includes a photodiode sensing region including a photodiode layer. The photodiode sensing region includes a photodiode layer. The photodiode layer includes a at least a double junction p-type/i-type/n-type semiconductor layer stack structure. the i-type semiconductor layer is a microcrystalline silicon structure or an amorphous germanium silicide structure.

In some embodiment, the light detection film is an array formed by the phototransistors. The array formed by the phototransistor includes a phototransistor sensing area. A photosensitive film transistor is disposed on the phototransistor sensing area of the phototransistors. The photosensitive film transistor includes a gate, a source, a drain, an insulating layer, and a light absorbing semiconductor layer. The photosensitive film transistor is an inverted coplanar structure. The inverted coplanar structure includes the gate, the insulating layer, and the source vertically arranged from bottom to top. The drain electrode and the source electrode are laterally coplanar. The insulating layer includes the gate so that there is no contact between the gate and the source, the gate and the drain. The source and the drain are isolated by the gap. A photosensitive leakage current channel is formed between source and drain laterally. The light-absorbing semiconductor layer is disposed in the photosensitive leakage current channel.

Storage medium and electronic device are provided in the instant application. An executable computer program is stored in the storage medium. When the executable computer program is executed, the following steps are executed: receive and store a default identification information in an electronic device. Receive an identification request and a to-be-authorized identification information collected by the electronic device. Receive the default identification information from the electronic device. Make a comparison of the to-be-authorized identification information and the default identification information. If they are determined to be matched, the identification being true, otherwise identification false. Identification information is authenticated, and the identification information can be collected real-time because the default identification information is stored in the electronic device in advance. Therefore, the operator of the electronic device being the registered user can be ensure so that safety of verification can be improved effectively.

DESCRIPTION OF REFERENCE NUMERALS

Figure 1:
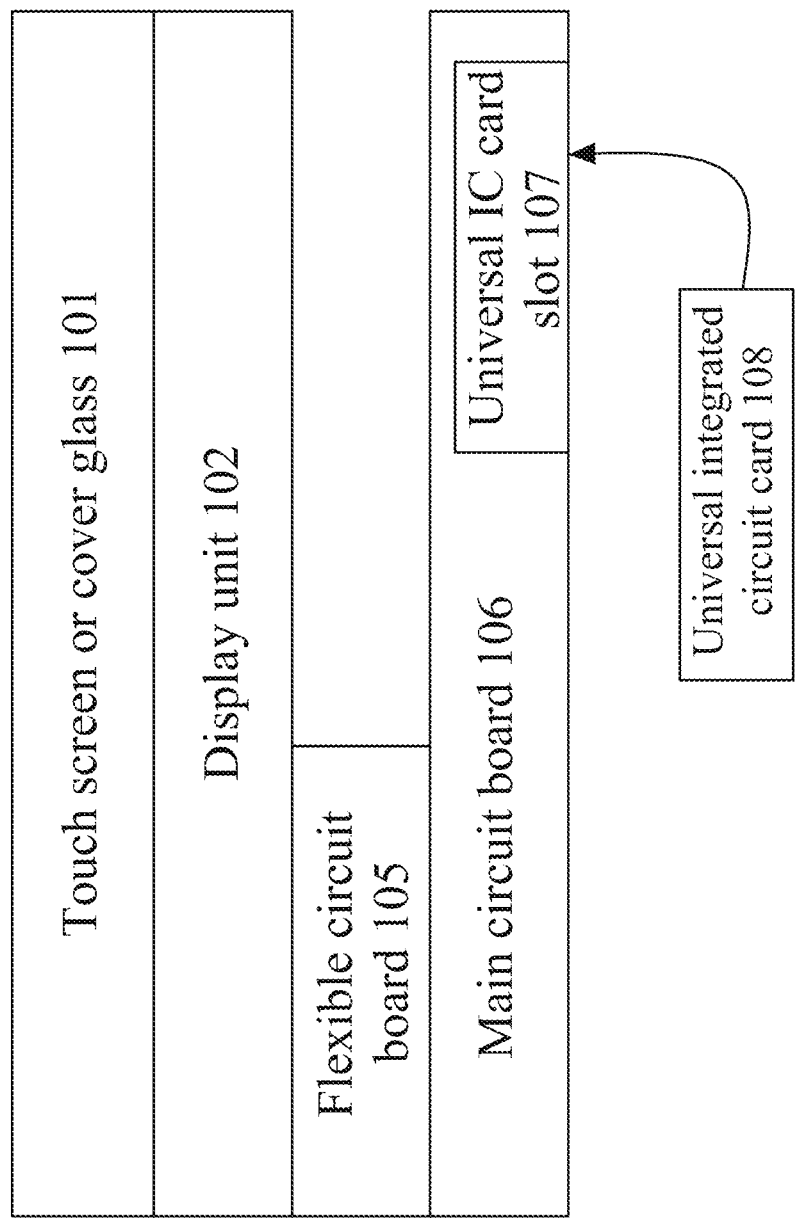
FIG. 1 shows a schematic diagram of an electronic device according to an embodiment of the instant application.

1. Gate; 2. Source; 3. Drain; 4. Insulating layer; 5. Light absorbing semiconductor layer;
101. Touch screen or cover glass;
102. Display unit;
103. Low refractive index glue;
104. Light detector;
105. Flexible circuit board;
106. Main circuit board;
107. Universal IC card slot;
108. Universal integrated circuit card.

DESCRIPTION OF THE PREFERRED EMBODIMENTS

The Universal Integrated Circuit Card (UICC) is a general term for smart card having physical properties. They can be used as a mobile smart card to save user information, authentication key (includes public key and private key) or payment information if they are apply in the terminal device for broadband mobile network. ISO/IEC international standards organization has formulated a series of smart card security feature agreements to ensure the secure access of UICC files to terminal devices of broadband mobile network users. UICC introduces the concept of multiple application platforms and implements a multi-channel mechanism which multiple logical applications run simultaneously. In UICC, there are included a plurality of logical module such as Subscriber Identity Module (SIM), Universal Subscriber Identity Module (USIM), IP Multimedia Service Identity Module (ISIM) and other Non-telecom application modules (i. e. electronic signature authentication or electronic wallet). Those logical modules can be single or plural.

The UICC is used to the application module about electronic signature authentication or electronic wallet in terminal device, and the ISO/IEC International Standardization Organization's security feature protocol guarantees the terminal device's secure access to UICC files. However, they are not suitable for mobile terminal identification that has become more and more popular. For example, fingerprint recognition, face recognition, etc., the current method is still relying on the sensor and application program configured on the terminal. Those identification functions are for the main purpose of unlocking the terminal device, or to realize the unlocking function on an application program that relatively considers information security. The application or hardware processor with recognition function only compares identification image input by user's press (i.e. fingerprint information) with image stored in software and hardware disposed to the terminal device (i.e. pre-set fingerprint images). However, they are not tied with UICC encryption function.

To this end, a storage medium and an electronic device are provided in the instant application to solve the problems of hidden safety risk in the process of information verification.

In order to explain the technical content, structural features, achieved objectives, and effects of the technical solution in detail, the following describes it in detail with reference to specific embodiments and accompanying drawings.

A storage medium is provided in this embodiment of the instant application. An executable computer program is stored in the storage medium. The executable computer program is executed, includes: Receive and store a default identification information in an electronic device. Receive an identification request and a to-be-authorized identification information collected by the electronic device. The electronic device obtains the default identification information and makes a comparison of the to-be-authorized identification information and default identification information. If they are determined to be matched, the to-be-authorized identification information being true, otherwise the to-be-authorized identification information being false.

An electronic device is also provided in the instant application. Please refer the FIG. 1. The FIG. 1 shows a schematic diagram of an electronic device according to an embodiment of the instant application. The electronic device is a device with a touch screen, such as a smart mobile device such as a mobile phone, tablet computer, personal digital assistant, etc. The electronic device further can be a personal computer or a computer for industrial equipment. The electronic device includes a main circuit board 106, a processor, a sensor and a storage medium. A universal IC card slot 107 is disposed on the main circuit board 106, and a universal IC card 108 is disposed in the universal IC card slot 107. The processor is an electronic element with data processing function such as Central Processing Unit (CPU), Digital Signal Processor (DSP) or System on Chip (SoC). The storage medium is an electronic element with data processing function, includes RAM, ROM, magnetic disk, magnetic tape, optical disk, flash memory, U disk, mobile hard disk, memory card, memory stick, etc.

An executable computer program is stored in the storage medium. The computer program is executed by a processor, including: Receive and write a default identification information into the universal IC card. Receive an identification request and a to-be-authorized identification information collected by the sensor. Obtain the default identification information from the universal IC card. Make a comparison of the to-be-authorized identification information and the corresponded default identification information. If they are determined to be matched, the to-be-authorized identification information being true, otherwise the to-be-authorized identification information being false.

Because the default identification information is pre-stored in the universal integrated circuit card (hereinafter referred to as UICC), the processor can obtain the default identification information from the UICC and make a comparison of the default identification information and the to-be-authorized identification information to implement identification process. It can ensure that the identification operator of the device is the legally registered user himself because the identification information is collected and authenticated immediately. Compared with the authentication method on the cloud server, the security of the identification process is effectively improved.

In this embodiment, the sensing element is selected from a group consisting of ordinary camera, infrared camera and microphone. The default identification information is selected from a group consisting of face information, fingerprint information, eyeball information, iris information and voice information, blood volume information. Specifically, the ordinary camera can be used to collect face information and eyeball information. The infrared camera can be used to collect iris information. The microphone can be used to collect voice information. The user can turn on different sensing elements on the electronic device to collect identification information according to actual requirement. A plurality of sensing elements disposing provide users with more choices, effectively improving the user's sensory experience.

In some embodiment, the computer program is executed by a processor, and receiving and storing a default identification information in an electronic device includes: receive the default identification information collected by an external identification sensor. Write the default identification information into a universal integrated circuit card of the electronic device. The external identification sensor is independent of the electronic device. In some embodiment, the computer program is executed by a processor, and receiving and storing a default identification information in an electronic device includes: receive the default identification information collected by an identification sensor of the electronic device. Write the default identification information into a universal integrated circuit card of the electronic device. In short, for the input of the preset identification information, it can be collected by the sensing element on the electronic device (i.e. cameras, microphones, etc. integrated on electronic devices), or it can be completed by the external sensing element (i.e. an external camera, external microphone, etc.). Therefore, more application scenarios are applicable.

In some embodiment, the electronic device further includes a display unit 102 disposed on top of the main circuit board 106. The display unit 102 is a display screen using active array thin film transistors as scan driving and data transmission. The display screen includes AMOLED display or micro LED display. The transmittance of the display screen is more than the 3% to implement light detection function because the luminous flux of light passed the display screen is sufficient to be receive by the light detector below the display screen in light detection function. In some embodiment, a touch screen or cover glass 101 is further disposed above the display unit 102 to meet the requirement of different terminal products.

In some embodiment, the display unit 102 and the main circuit board 106 are connected via a flexible circuit board 105. The flexible circuit board 105 includes a chip with a function of reading and identifying image signals. The chip of the identification function includes a fingerprint image reading chip, a fingerprint identification algorithm chip, etc. The chip model is such as the ADAS1256 chip of Analog Devices. Flexible circuit board is referred to as FPC, it has more advantage than ordinary hard resin circuit board such as high wiring density, light weight, thin thickness, less wiring space restrictions, and high flexibility. The disposing of the flexible circuit board can make the light detection device thinner and lighter to meet market demand.

In some embodiment, in order to strengthen the security of the default identification information and save the storage space of the default identification information in the UICC card, the computer program is executed by the processor, including: convert the default identification information into a default identification information abstract via cryptographic hash function (also referred to as hash). The default identification information is written as the default identification information abstract in the universal integrated circuit card of the electronic device. The hash function means the input (also called as pre-image) of any length is converted into a fixed-length output via a hash algorithm, and the output is the hash value. This conversion is a kind of compression mapping, that is, the space of the hash value is usually much smaller than the space of the input, and different inputs may be hashed into the same output. In short, the cryptographic hash function is a function that compresses an information of any length to a fixed length information digest. The storage space of the default identification information can be compressed via conversion so that the default identification information can be written better.

In some embodiment, the amount of the sensing element is plurality. Each sensing element is configured to collect different default identification information respectively. The computer program is executed by processor, including: receive the different default identification information collected by the sensing elements. Convert the multiple default identification information into the default identification information abstract via cryptographic hash function. In another embodiment, the computer program is executed by the processor, including: receive the multiple default identification information from the single sensing element. Convert the multiple default identification information into the default identification information abstract via cryptographic hash function.

For example, the default identification information can be multi-segment voice information. User can input a plurality of different voice information in sequence via the microphone of the electronic device. The collected multi-segment voice information are converted into a voice abstract via cryptographic hash function after the processor receives the multi-segment voice information (i. e. single sensor receives the multiple default identification information). For example, a plurality of default identification information include certain piece of voice information and face information, and the voice information and face information are converted into corresponded identification information abstract via cryptographic hash function. On the one hand, it provides users with more choices, on the other hand, it also effectively improves the security and accuracy of identity information authentication because the default identification information is plurality.

Figure 2:
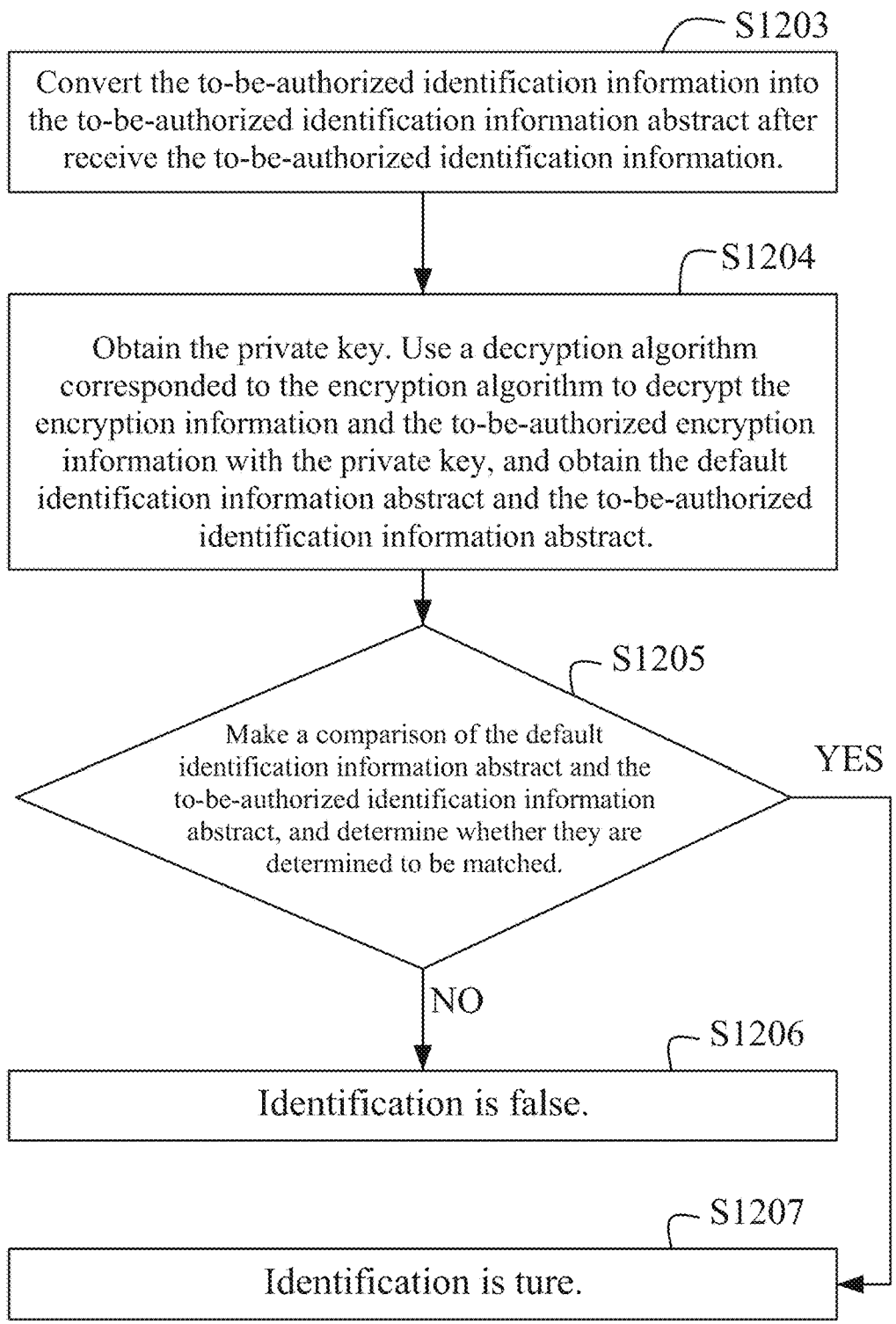
FIG. 2 shows a flow chart of steps when a computer program according to an embodiment of the instant application is executed by a processor.

As shown in FIG. 2, there is a flow chart of a computer program according to an embodiment of the instant application is executed by a processor. The computer program is executed by the processor, including:

Step S1203: after receive the to-be-authorized identification information, convert the to-be-authorized identification information into a unknown identification information abstract via a cryptographic hash function. Use an encryption algorithm (E. g. Rivest-Shamir-Adleman, RSA) with the public key to encrypt the to-be-authorized identification information abstract in order to obtain a to-be-authorized encryption information. The to-be-authorized encryption information includes an encrypted unknown identification information abstract.

In some embodiment, an authentication key is stored in the electronic device, and the authentication key includes the public key. Step S1204: obtain the private key. Use a decryption algorithm corresponded to the encryption algorithm to decrypt the encryption information and the to-be-authorized encryption information with the private key, and obtain the default identification information abstract and the to-be-authorized identification information abstract.

In some embodiment, the private key is stored in the universal integrated circuit card of the electronic device.

In some embodiment, before Step S1204, the computer program is executed by the processor, including: convert the collected default identification information into a default identification information abstract, for example, by using a cryptographic hash function. Obtain the public key. Use encryption algorithm (E. g. RSA) to encrypt the default identification information abstract with the public key in order to obtain a default encryption information. The default encryption information includes an encrypted default identification information abstract, and the encrypted default encryption information is stored in the universal integrated circuit card of the electronic device.

Step S1205: make a comparison of the default identification information abstract and the to-be-authorized identification information abstract, and determine whether they are determined to be matched. If comparison is yes, enter Step S1207 and the identification is true; Otherwise enter Step S1206 and identification false. Since the public key and the private key are stored in the UICC card, the extraction security of the default identity identification information in the UICC card is greatly improved via the above method, which use public key encryption and private key decryption. In another embodiment, the algorithm to encrypt or decrypt the abstract is not only limited to the RSA algorithm, but also can be other encryption and decryption algorithms.

Figure 3:
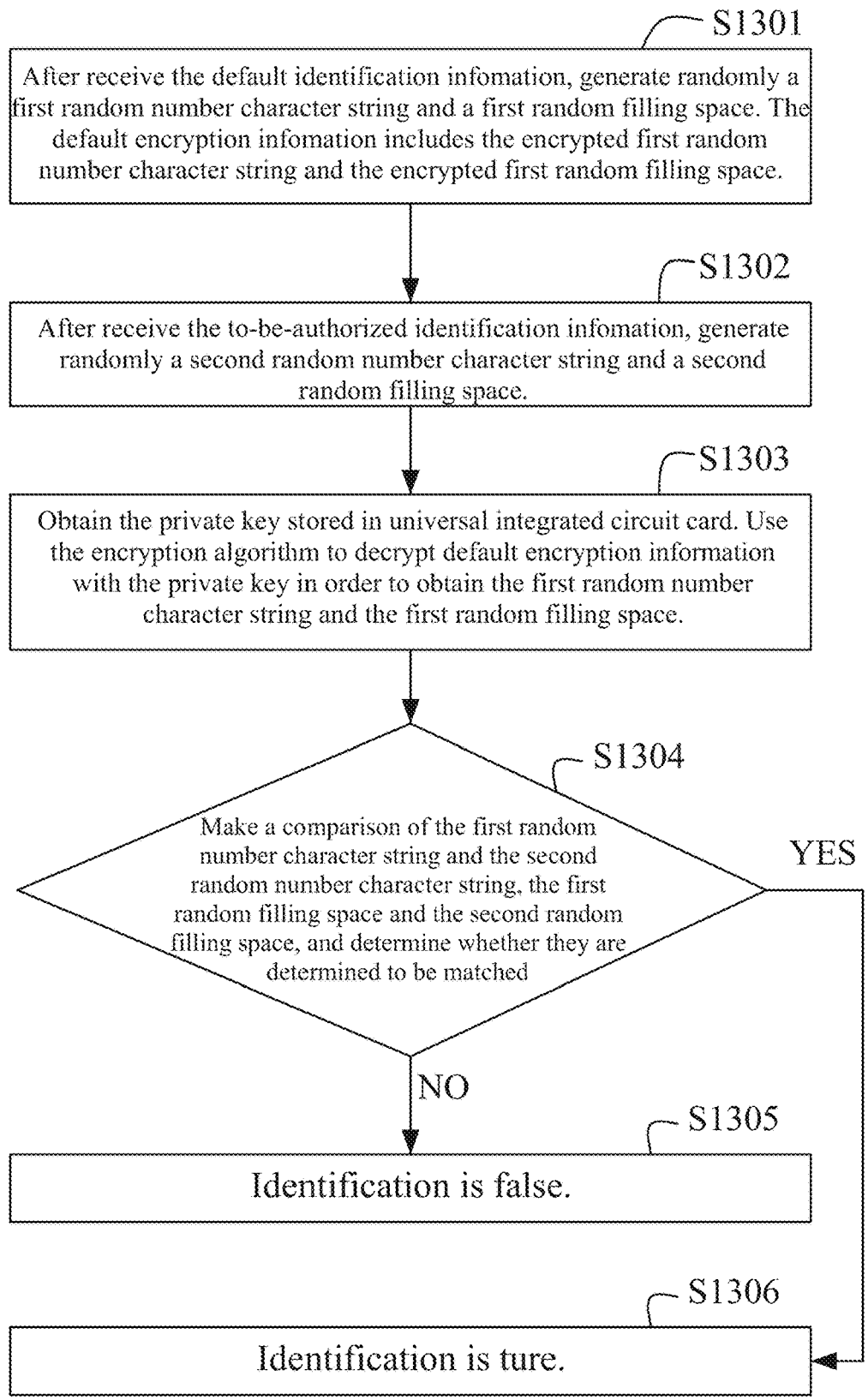
FIG. 3 shows a flow chart of steps when a computer program according to another embodiment of the instant application is executed by a processor.

As shown in FIG. 3, in some embodiment, in order to further improve the security of information authentication, the computer program is executed by the processor, including:

First, enter Step S1301. After receive the default identification information, generate randomly a first random number character string and a first random filling space. The first random filling space is generated randomly and is filled on the character string of the default identification information abstract. The default encryption information includes the encrypted first random number character string and the encrypted first random filling space.

Then, enter Step S1302. After receive the to-be-authorized identification information, generate randomly a second random number character string and a second random filling space. The second random filling space is generated randomly and is filled on the character string of the to-be-authorized identification information abstract.

Then, enter S1303. Obtain the private key stored in universal integrated circuit card. Use the encryption algorithm (e. g. RSA) to decrypt default encryption information with the private key in order to obtain the first random number character string and the first random filling space.

Then, enter Step S1304. Make a comparison of the first random number character string and the second random number character string, the first random filling space and the second random filling space, and determine whether they are determined to be matched. If they are determined to be matched, enter Step S1306 and the identification is true; otherwise, enter Step S1305 and identification is false. In short, if the to-be-authorized identification information want be approved, it is required that one or more of the first random number character string and the second random number character string, the first random filling space and the second random filling space match besides match of the generated abstract and the default identification information abstract in the UICC card so that the security of identity information authentication is effectively improved.

In some embodiment, in order to allow users to set different application software or the encryption level of electronic device startup according to actual needs. The computer program is executed, including:

Receive an encryption level setting instruction to set an encryption level of the electronic device. The encryption level includes a first encryption level, a second encryption level and a third encryption level.

When the electronic device is in first encryption level, a condition of an authorization being true is that of the default identification information matching with the to-be-authorized identification information abstract, the first random number character string matching with the second random number character string, and the first random filling space matching with second random filling space.

When the electronic device is in second encryption level, a condition of another authorization being true is that of the default identification information matching with the to-be-authorized identification information abstract. The condition of identification being true further includes successful matches of the first random number character string matching with the second random number character string or the first random filling space matching with the second random filling space.

When the electronic device is in third encryption level, a condition of another authorization being true is that of the default identification information matching with the to-be-authorized identification information abstract.

In short, the encryption level from high to low is the first encryption level, the second encryption level and the third encryption level. Users can set the encryption level of these applications to the first encryption level for applications that require strong encryption, such as software that involves financial transactions, trade secret data, and online payment passwords. Thus, only if there are three successful matches of the default identification information matching with the to-be-authorized identification information abstract, the first random number character string matching with the second random number character string, and the first random filling space matching with second random filling space, corresponding unlock operation or payment operation will be completed so that the security of information and data can be improved. Users can set the encryption level of these applications to the second or third encryption level for applications that do not require strong encryption, such as browsing album photos.

Figure 4:
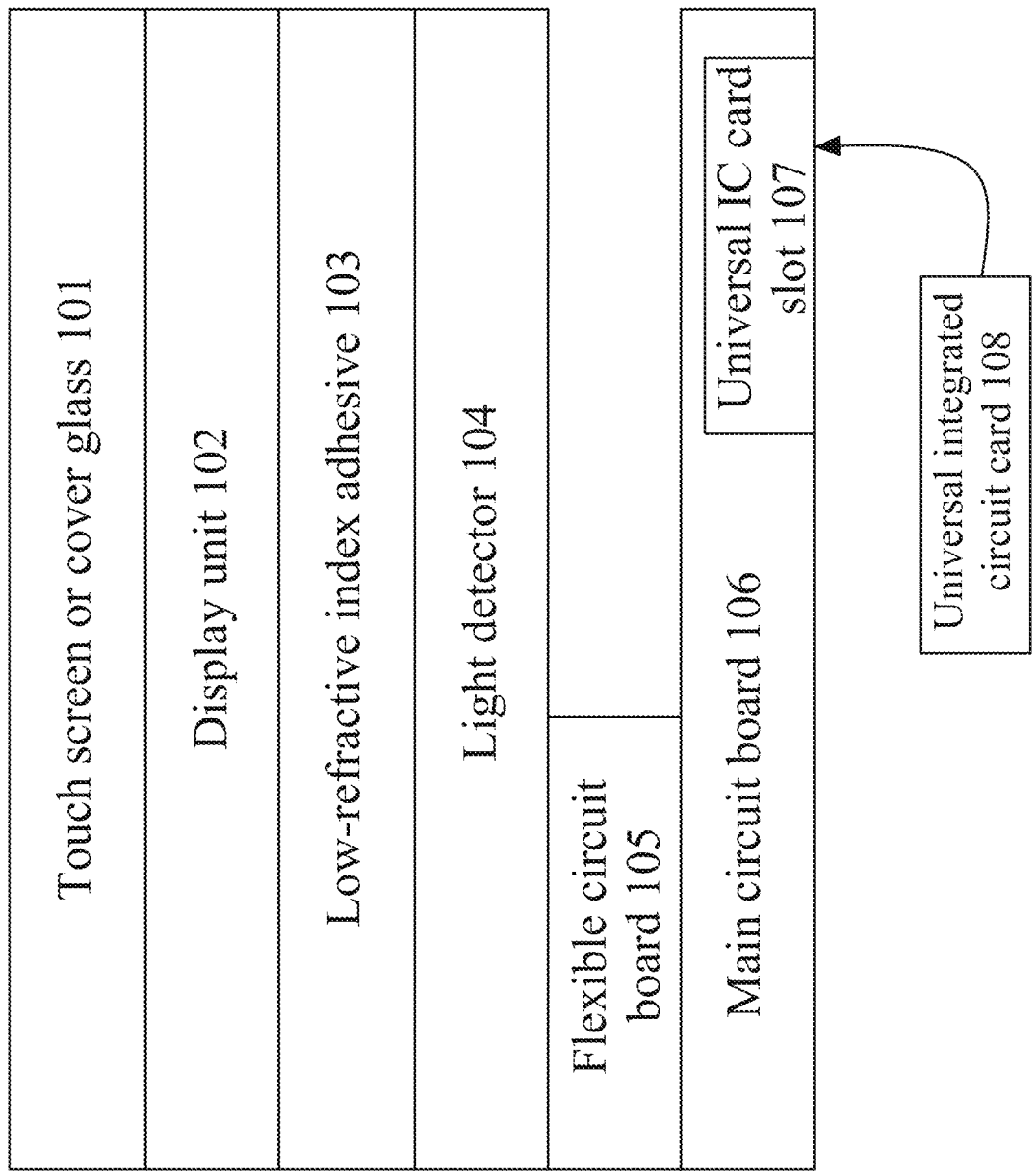
FIG. 4 shows a schematic diagram of the structure of electronic device in another embodiment.

As shown in FIG. 4. There is a schematic diagram of the structure of electronic device in another embodiment. In this embodiment, the sensing element is a light detector 104. The electronic device includes a display 102, a light detector 104, a main circuit board 106, a processor and a storage medium. The display unit 102, the light detector 104 and the main circuit board 106 are disposed from top to down. The light detector 104 is connected to the processor. An identification area is disposed on the display unit 102, and the light detector 104 is disposed below the identification area. A universal IC card slot 107 is disposed on the main circuit board 106, and a universal integrated circuit card 108 is disposed in the A universal IC card slot 107.

In some embodiment, the lower surface of the display unit 102 and the upper surface of the light detector 104 can be bonded by a low refractive index adhesive, for example, the refractive index of the adhesive is less than 1.4. On the one hand, the low-refractive index adhesive can be used as adhesive role, so that the light detection device 104 is fastened to the bottom surface of the display unit 102, and it is not easy to fall off. On the other hand, when light is irradiated into the light detector 104 through the display unit 102, due to the refraction effect of the low-refractive index glue (the refractive index of the glue is lower than the refractive index of the part on the light detector 104 that is in contact with it. Generally, the refractive index of the part on the light detector 104 that is in contact with the low refractive index glue is above 1.4), the light can be refracted at the position of the low-refractive index glue and can enter the light detector 104 in a vertical direction as much as possible. It can effectively improve the photoelectric conversion rate. In this embodiment, the low refractive index glue is an organic compound rubber with carbon-fluorine bond.

When the electronic device includes the light detector, the default identification information can be blood volume information or fingerprint information. Taking the default identification information as blood volume information as an example, when light passes through the human skin and enters other tissues below the body surface, some light will be absorbed, and some light will be reflected and scattered. The change of the light path depends on the structure of the tissue below the skin. In general, human blood can absorb more light than the surrounding tissue, so when the light signal encounters more blood, the less light signal is reflected back. Therefore, the blood volume information corresponding to the user can be obtained by detecting the light signal information reflected by the body part. According to the blood volume information corresponding to the user, other default identification information of the user (such as blood pressure index, body fat content, blood oxygen saturation, cardiopulmonary index, electrocardiogram, etc.) can be obtained through conversion.

In some embodiment, when the electronic device collects the to-be-authorized identification information, it still uses a combination of preset array pixels on the display unit to illuminate the body part where the identity information to be collected is located, and light detector will receive reflected light signal and obtain the identification information. When the identification information is collected, the computer program can cooperatively encode the array pixel groups on the display unit to illuminate the body part with the encrypted combined light source and receive the light information from the body part. The preset array pixel combination can be a pixel array in which a certain part of the display unit is arranged into a preset pattern, and the preset pattern may be set according to actual needs. Compared with the manner in which all array pixels on the display unit 102 emit light sources, the above method can further improve the security of information collection.

In some embodiments, the light detector 104 is a TFT image sensing array film which includes a plurality of pixels detection area. Each pixel detection area is correspondingly provided with a group of scanning and driving data transmission pixel film circuit and a light detection film which are Composed of more than one thin film transistor. The light detection film includes a photodiode or a phototransistor.

Figure 5:
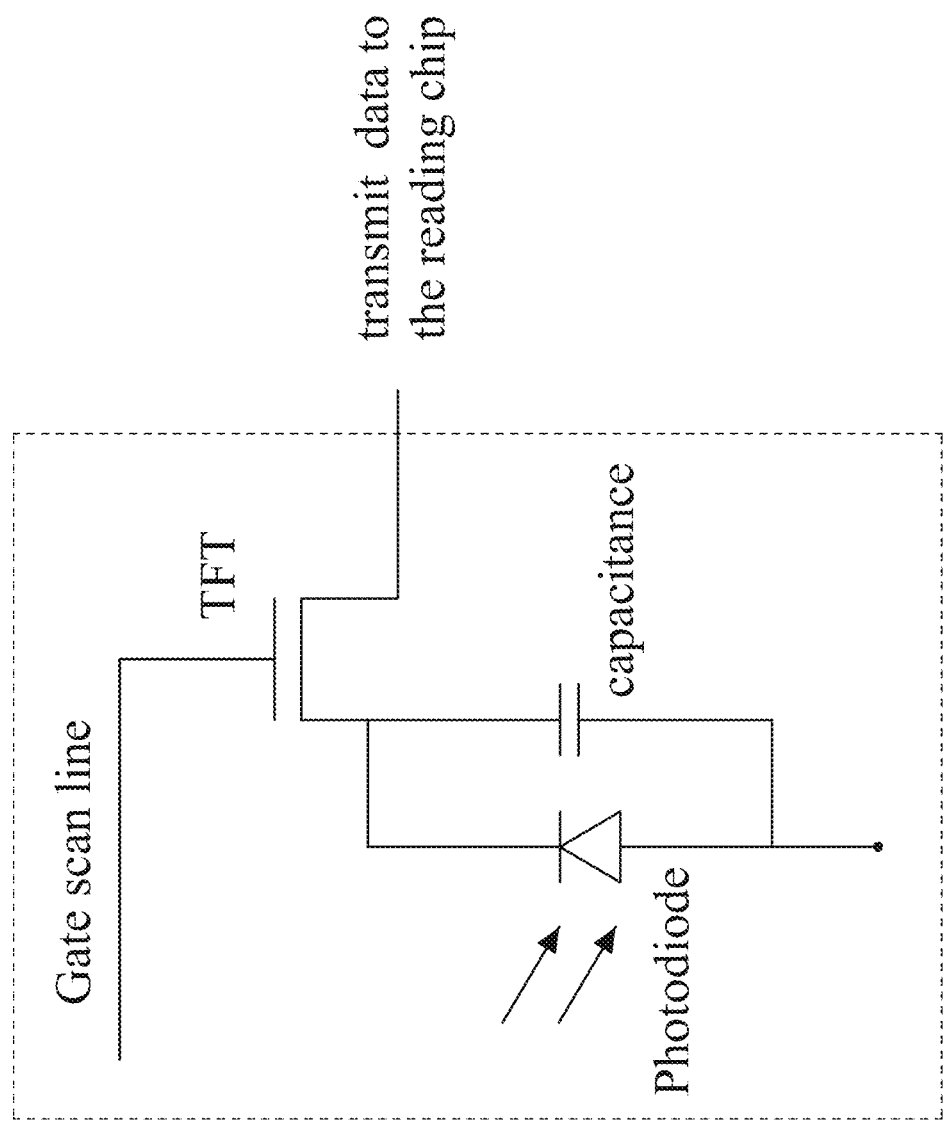
FIG. 5 shows a circuit diagram of basic circuit composition of each pixel detection area.

Taking light detection film including photodiode as an example, the basic circuit composition of each pixel detection area is shown in FIG. 5. Photodiode is the main sensor device forming the light detection film. The gate scan line operates the thin film transistor (TFT) in the opening mode at a fixed frame rate. When the light detection device detects the light signal, the opened thin film transistor can transmit the capacitor voltage data to the reading chip. Refer to the following two documents for details: 【1】 "M. J. Powell, I. D. French, J. R. Hughes, N. C. Bird, O. S. Davies, C. Glasse, and J. E. Curran, 【2】 "Amorphous silicon image sensor arrays," in Mater. Res. Soc. Symp. Proc., 1992, vol. 258, pp. 1127-1137", "B. Razavi, "Design of Analog CMOS Integrated Circuits," McGraw-Hill, 2000"

The light detector is a TFT image sensing array film. The light detection wavelength range includes a visible spectrum or infrared spectrum. The TFT image sensing array film is composed of a plurality of light detection films, and each light detection films corresponds to one pixel. Therefore, the TFT image sensing array film can be used to detect a plurality of pixels to form a corresponding image. For each light detection films, there are several implementation methods:

First Embodiment

The TFT image sensing array (i.e. light detector) is an array formed by photodiodes, and the array formed by photodiodes includes a photodiode sensing region. The existing LCD panel or an OLED (Organic Light Emitting Diode) display panel is driven by a TFT structure to scan a single pixel to realize the display function of a pixel array on the panel. A main structure for forming a TFT switching function is a Field Effect Transistor (FET), wherein well-known semiconductor layer materials mainly include amorphous silicon, polycrystalline silicon, indium gallium zinc oxide (IGZO), organic compounds mixed with nano carbon materials, etc.

Since the structure of a photodiode can also be prepared from such semiconductor materials, and production equipment is also compatible with the production equipment of TFT arrays, the TFT photodiode has started to be produced by a TFT array preparation method in recent years. A specific structure of the photodiode may refer to descriptions in a U.S. Pat. No. 6,943,070B2 and a PRC patent CN204808361U. A production process of the TFT image sensing array is different from that of the TFT structure of the display panel in that a pixel opening region of the display panel is changed to a photo-sensing region in the production process. The TFT may be prepared by a method of using thin glass as a substrate or using a high temperature-resistant plastic material as the substrate, as described in the U.S. Pat. No. 6,943,070B2.

The existing TFT image sensing array film is susceptible to factors such as the surrounding ambient light or visible light reflection and refraction from the display pixels so it would cause optical interference and severely affecting the signal to noise ratio (SNR) of the TFT image sensing array film embedded under the display panel.

Figure 6:
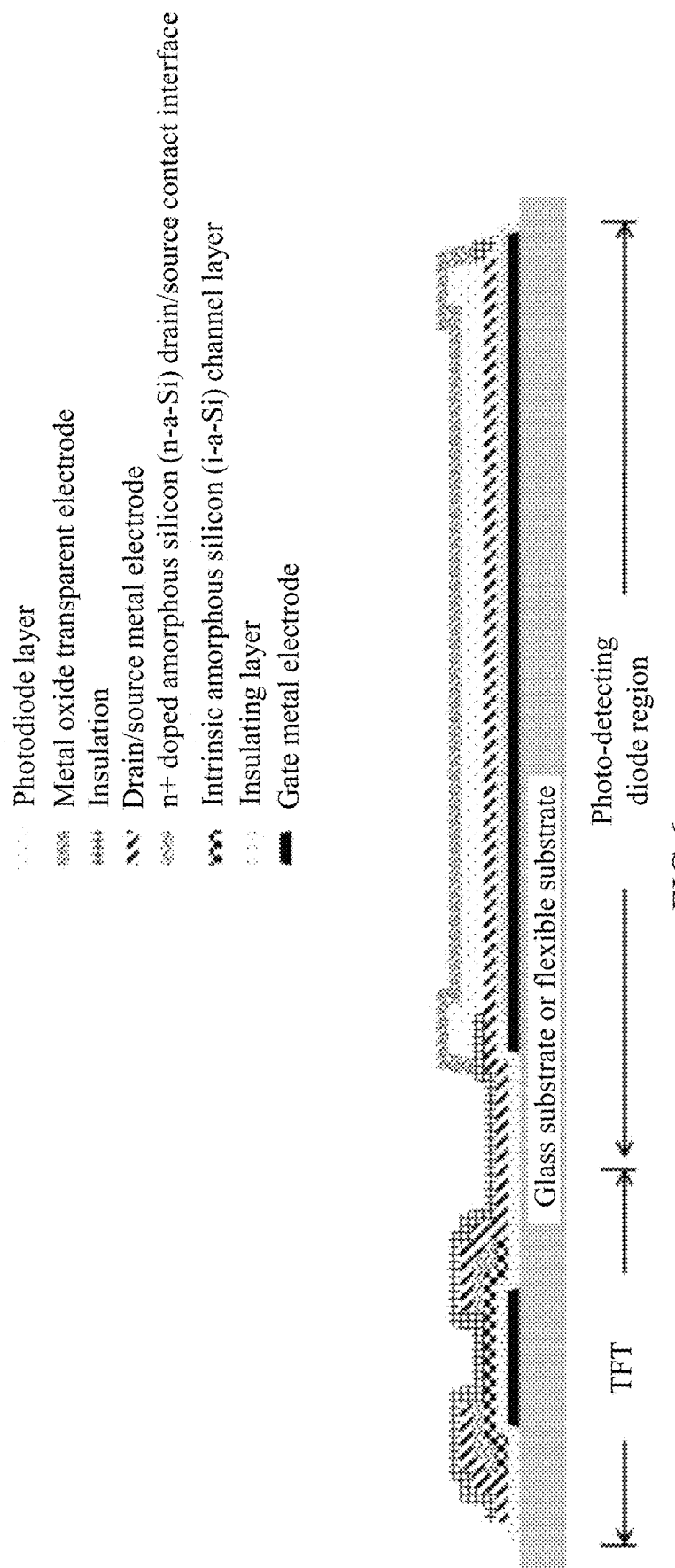
FIG. 6 shows a schematic diagram of the light detection film.
Figure 7:
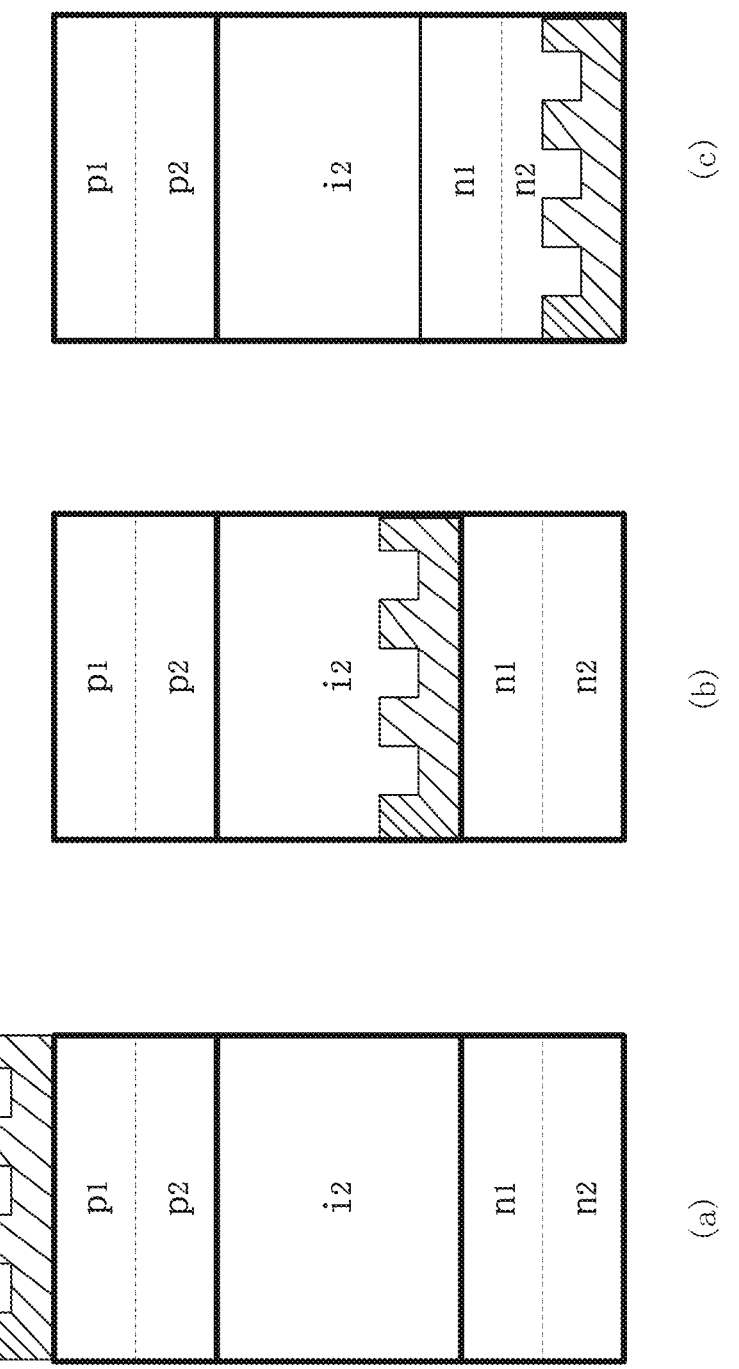
FIG. 7 shows a schematic diagram of the distribution of optical element

In order to improve the SNR, the light detection film shown in FIG. 6 is improved, so that the TFT image sensing array film can detect and identify the infrared signal reflected by the user's body part. The specific structure of the improved TFT image sensing array film is as FIG. 7:

The photodiode includes a p-type semiconductor layer, a i-type semiconductor layer and a n-type semiconductor layer. The p-type semiconductor layer, i-type semiconductor layer, and n-type semiconductor layer are stacked from top to bottom. The i-type semiconductor layer is a microcrystalline silicon structure or an amorphous germanium silicide structure. The microcrystalline silicon structure is a semiconductor layer formed by silane and hydrogen via chemical vapor deposition. The microcrystalline silicon structure is a semiconductor layer formed by silane and hydrogen via chemical vapor deposition, the crystallinity of the microcrystalline silicon structure is higher than 40%, and the band gap of the microcrystalline silicon structure is less than 1.7 eV. The amorphous germanium silicide structure is an amorphous semiconductor layer formed by silane, hydrogen, and germane via chemical vapor deposition; the band gap of the amorphous semiconductor layer is less than 1.7 eV.

The band gap is a width of forbidden band (unit is electron volts (eV)). The energy of electrons in solids cannot be continuously measured, because they are discontinuous energy bands. To conduct electricity, free electrons must be existed. The energy band which has free electron is called the conduction band (which can conduct electricity). To become a free electron, a bound electron must obtain sufficient energy to transition from the valence band to the conduction band. The minimum value of energy of transition is the band gap. The band gap is an important characteristic parameter of semiconductors. It's value is mainly determined by the energy band structure of the semiconductor. It is related to the crystal structure and the bonding properties of atoms.

At room temperature (300K), the band gap of germanium is about 0.66 ev. Germanium is contained in silane. The band gap of i-type semiconductor layer will be reduced after doped with germanium. When the band gap is less than 1.7 eV, it means that the i-type semiconductor layer can receive optical signals in a wavelength range from visible spectrum or infrared spectrum (or near-infrared light). The operating wavelength range of photodiodes containing amorphous or microcrystalline germanium silicide structures can be extended to the range of light wavelengths from 600 nm to 2000 nm via adjusting the GeH4 concentration of chemical meteorological deposits.

Second Embodiment

On the basis of the first embodiment, in order to improve the quantum efficiency of photoelectric conversion, the amorphous silicon photodiode can also be formed by stacking p-type/i-type/n-type structures with a double junction or more. The p-type/i-type/n-type material of the first junction layer of the photodiode is still an amorphous silicon structure. The p-type/i-type/n-type material above the second junction layer may be a microcrystalline structure, a polycrystalline structure, or doped with compound materials that can extend the photosensitive wavelength range.

In short, multiple groups of p-type/i-type/n-type structures can be stacked on top of each other to form a photodiode structure to achieve a photodiode structure. For each p-type/i-type/n-type structure, the photodiode structure described in the first embodiment is used.

Third Embodiment

On the basis of the first or second embodiment, for each p-type/i-type/n-type structure, the p-type semiconductor layer may be a multilayer structure with more than two layers. For example, the p-type semiconductor layer is a three-layer structure which includes a first p-type semiconductor layer (p1 layer), a second p-type semiconductor layer (p2 layer), and a third p-type semiconductor layer (p3 layer) from top to bottom. The p1 layer can adopt an amorphous structure and be heavily doped with boron (the boron concentration is more than twice that of the standard process). The p2 and p3 adopt a microcrystalline structure and are normally doped with boron (doped in accordance with the standard process concentration). The absorption of light can be reduced by the thinner p2 and p3 layers, so that light enters the i-layer as much as possible and is absorbed by the i layer to improve photoelectric conversion rate. On the other hand, the p2 layer and the p3 layer are normally doped with boron, which can effectively prevent the built-in potential from being deteriorated due to the heavy doping of p1 layer. When the p-type semiconductor layer includes a multi-layer structures having other numbers of layer, the structure is similar as other layer, and the details are not described again.

Similarly, the n-type semiconductor layer may have a multilayer structure with more than two layers. For example, the n-type semiconductor layer is a three-layer structure which includes a first n-type semiconductor layer (n1 layer), a second n-type semiconductor layer (n2 layer), and a third n-type semiconductor layer (n3 layer) from top to bottom. The n3 layer can adopt an amorphous structure and be heavily doped with phosphorus (the phosphorus content is more than twice that of the standard process). The n1 and the n2 adopt microcrystalline structure and are normally doped with phosphorus (according to standard production process). The absorption of light can be reduced by the thinner p2 and p3 layers, so that light enters the i-layer as much as possible and is absorbed by the i-layer to improve photoelectric conversion rate. On the other hand, the normal phosphorus doping of the n1 layer and the n2 layer can effectively prevent the built-in potential from being deteriorated due to the heavy doping of the n3 layer. When the n-type semiconductor layer includes a multi-layer structure having other numbers of layer, the structure is similar as other layers, and the details are not described again.

Fourth Embodiment

This embodiment is a further improvement of the first, second or third embodiment. As shown in (a) of FIG. 7, specifically, a first optical element is disposed on a top surface of the p-type semiconductor layer. The first optical element is configured to reduce reflectance of light on the top end of the p-type semiconductor layer or reduce refraction angle of light in the p-type semiconductor to increase the amount of light incident. Reducing the angle of refraction of light in the p-type semiconductor layer allows the light to enter the p-type semiconductor layer as close to the vertical direction as possible, so that the light is absorbed as much as possible by the i-type semiconductor layer below the p-type semiconductor layer, thereby the photoelectric conversion rate of the photodiodes is further improved. the first optical element is disposed on the top surface of the uppermost p-type semiconductor layer when the p-type semiconductor layer is a multilayer structure.

The first optical element includes a photonic crystal structure with a periodically changing refractive index, micro lens array structure or diffuse scattering structure with aperiodic change of refractive index. The refractive index of the first optical element is lower than the refractive index of the p-type semiconductor layer, so that the incident angle is lower than the refractive angle after the light is refracted by the first optical element. That means the light enters the p-type semiconductor layer as close to the vertical direction as possible.

Fifth Embodiment

This embodiment is a further improvement of the first, second, third or fourth embodiment. As shown in (b) (c) in FIG. 7, a second optical element is further disposed on the bottom surface of the n-type semiconductor layer. The second optical element is configured to increase the multiple reflectance of light on the bottom end surface of the n-type semiconductor layer. The multiple reflectance means that the light enters the i-type semiconductor layer after being reflected by the second optical element and is absorbed by the i-type semiconductor layer. The absorbed light enters the i-type semiconductor layer after being reflected again by the second optical element. This is repeated many times to improve the photoelectric conversion rate of the i-type semiconductor layer. The second optical element is disposed on the bottom end surface of the lowermost n-type semiconductor layer when the n-type semiconductor layer is a multilayer structure.

It should be noted that, in this context, the directional terms such as "upper", "lower", "left", and "right" are described at the angle shown in the figure. It should not be understood as a limitation of the embodiments of the present application.

In addition, in the context, it also needs to be understood. When it is mentioned that one element is connected "on" or "down" to another element, it can not only be directly connected to "on" or "down" of another element, but also be indirectly connected to "on" or "down" another element through an intermediate element The second optical element includes a photonic crystal structure with a periodically changing refractive index or a diffuse scattering structure with aperiodic change of refractive index. The refractive index of the second optical element is lower than the refractive index of the n-type semiconductor layer. In this way, the light can be reflected as much as possible on the lower end face of the n-type semiconductor layer, so that the reflected light is absorbed again by the i-type semiconductor layer, thereby the signal in the wavelength range of light absorbed by i-type semiconductor is appropriately amplified to increase the photoelectric flux in this wavelength range.

Sixth Embodiment

Figure 8:
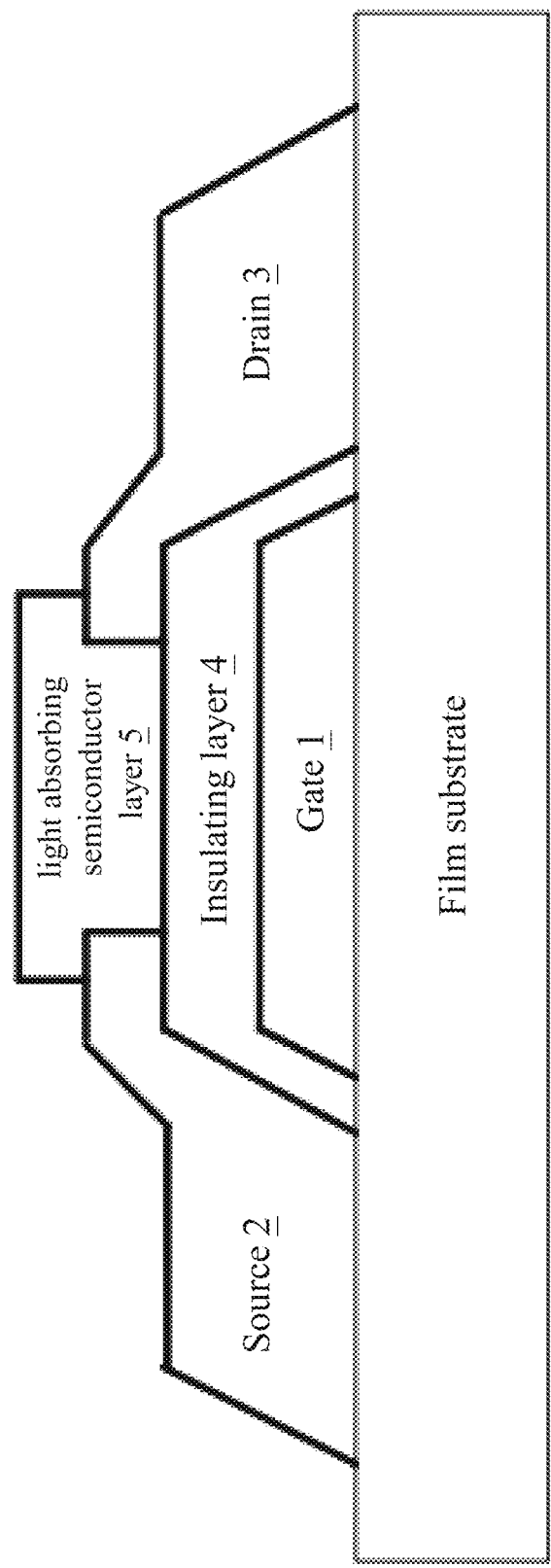
FIG. 8 shows a schematic diagram of the light detection film of another embodiment.

As shown in FIG. 8, the TFT image sensing array film is an array formed by the phototransistors. The array formed by the phototransistor includes a phototransistor sensing area. A photosensitive film transistor is disposed on the phototransistor sensing area of the phototransistors. The photosensitive film transistor includes a gate 1, a source 2, a drain 3, an insulating layer 4, and a light absorbing semiconductor layer 5. The photosensitive film transistor is an inverted coplanar structure. The inverted coplanar structure includes the gate 1, the insulating layer 4, and the source 2 vertically arranged from bottom to top. The drain electrode 3 and the source electrode 2 are laterally coplanar. The insulating layer 4 includes the gate 1 so that there is no contact between the gate 1 and the source 2, the gate 1 and the drain 3. The source 2 and the drain 3 are isolated by the gap. A photosensitive leakage current channel is formed between source 2 and drain 3 laterally. The light-absorbing semiconductor layer 5 is disposed in the photosensitive leakage current channel.

Generally, no current will flow between the source and the drain when the TFT is controlled by the gate voltage to operate in the off state. However, the electron-hole pair is excited by the energy of the light in the semiconductor when the TFT is irradiated by a light source. The field effect of the TFT structure will cause the electron-hole pair separation, so that a photosensitive leakage current is generated on the TFT. This photosensitive leakage current characteristic allows the TFT array to be applied to light detection or light detection technology. Compared with a general device that uses TFT leakage current as a photosensitive film transistor, is a light absorbing semiconductor layer on the uppermost light absorbing layer by the inverted coplanar field effect transistor structure in the present disclosure. That greatly increases the excitation of photoelectrons and improves the photoelectric conversion efficiency.

Figure 9:
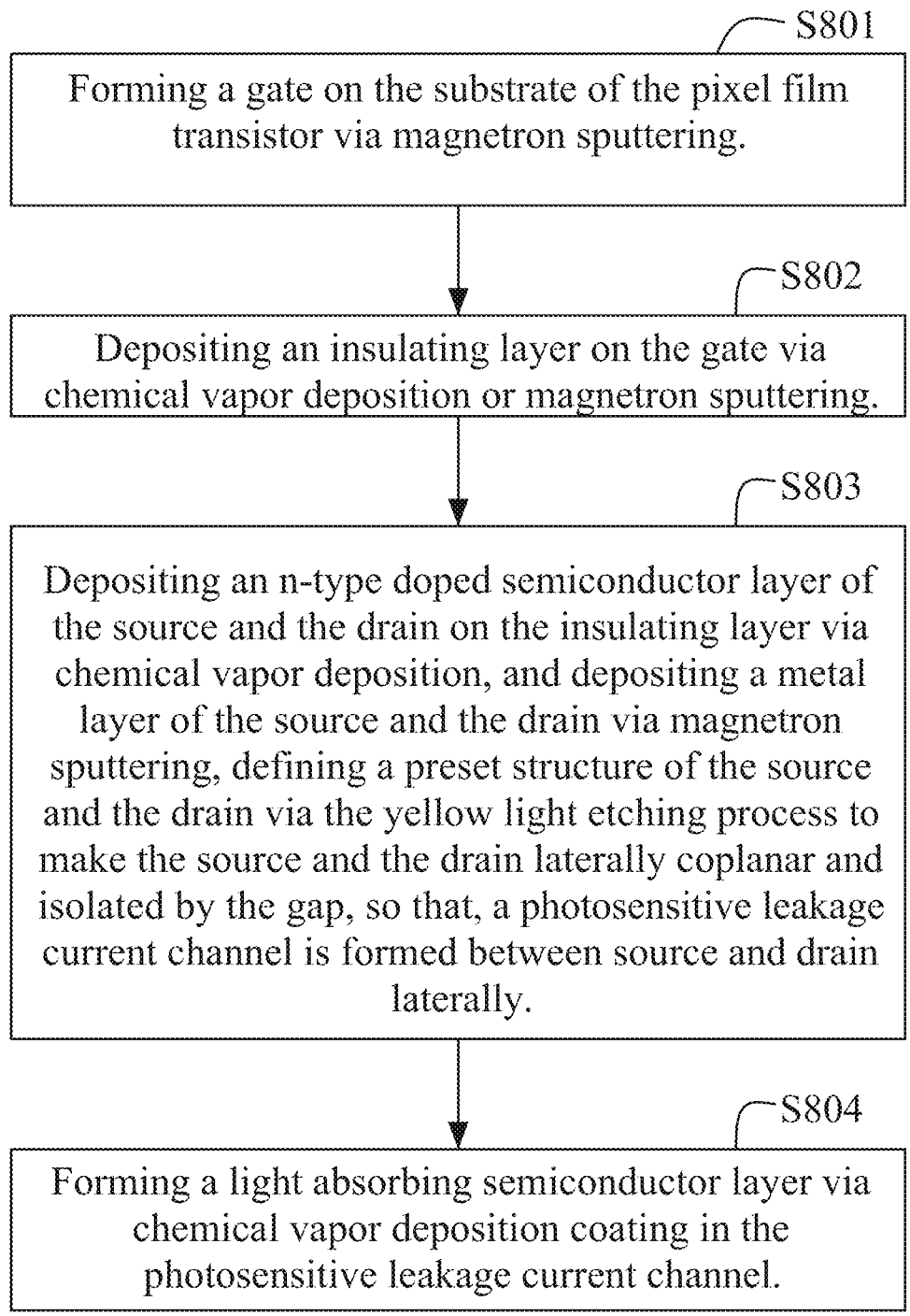
FIG. 9 shows a flowchart of an embodiment of a method for preparing light detection film.

As shown in FIG. 9, it is a flowchart of an embodiment of a method for preparing light detection film of the present disclosure. The method is configured to prepare a photosensitive film transistor (i.e, a light detection film) of the sixth embodiment, and includes the following steps:

First, a step S801 of forming a gate on the substrate of the pixel film transistor via magnetron sputtering. The substrate of the pixel film transistor can be a rigid board or a flexible material (such as polyimide) is executed.

Next, a step S802 of depositing an insulating layer on the gate via chemical vapor deposition or magnetron sputtering is executed.

Next, a step S803 of depositing an n-type doped semiconductor layer of the source and the drain on the insulating layer via chemical vapor deposition, and depositing a metal layer of the source and the drain via magnetron sputtering, defining a preset structure of the source and the drain via the yellow light etching process to make the source and the drain laterally coplanar and isolated by the gap, so that, a photosensitive leakage current channel is formed between source and drain laterally is executed.

Next, a step S804 of forming a light absorbing semiconductor layer via chemical vapor deposition coating in the photosensitive leakage current channel is executed.

Seventh Embodiment

In terms of the familiar field effect transistor structure, the TFTs as scan drive and data transfer switches do not need to be designed specifically for the structure that collects photocurrent between the source and drain. However, in the application of field effect transistor in the detection of photosensitive leakage current, if the electron-hole pair excited by light is separated by field effect, the drift path driven by the electric field is too long, it is very likely that the photoelectrons will recombine with the holes or trapped by the dangling bond defect of the light absorbing semiconductor layer itself before they successfully reach the electrode. Thus, photocurrent output cannot be effectively used for photodetection.

In order to improve the photosensitive leakage current affected by the channel length between the source and the drain, so as to increase the area of the light-absorbing semiconductor without deteriorating the photoelectric conversion efficiency. In this embodiment, the source and the drain of the fourth embodiment are further improved, and a new structure of the source and the drain is proposed.

Figure 10:
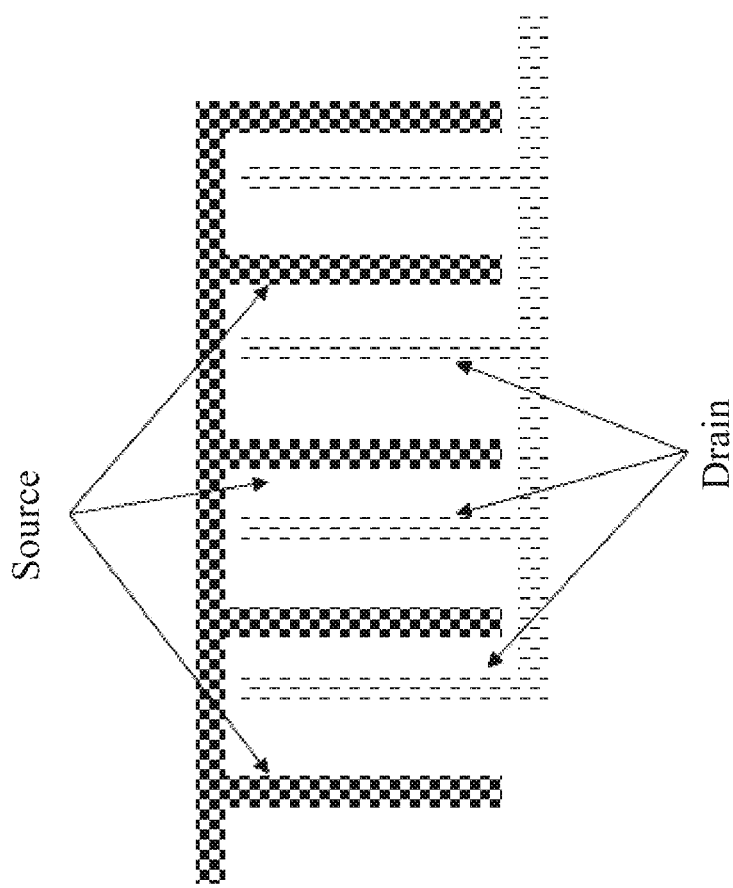
FIG. 10 shows a schematic diagram of source and drain structure coordination.
Figure 11:
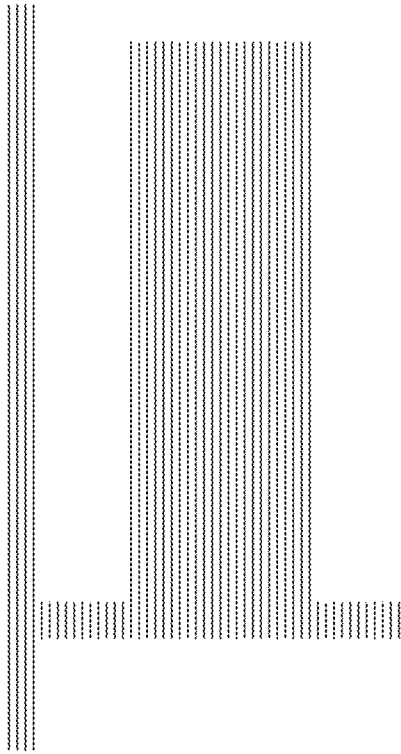
FIG. 11 shows a schematic diagram of a method for preparing light detection film.
Figure 11:
Figure 12:
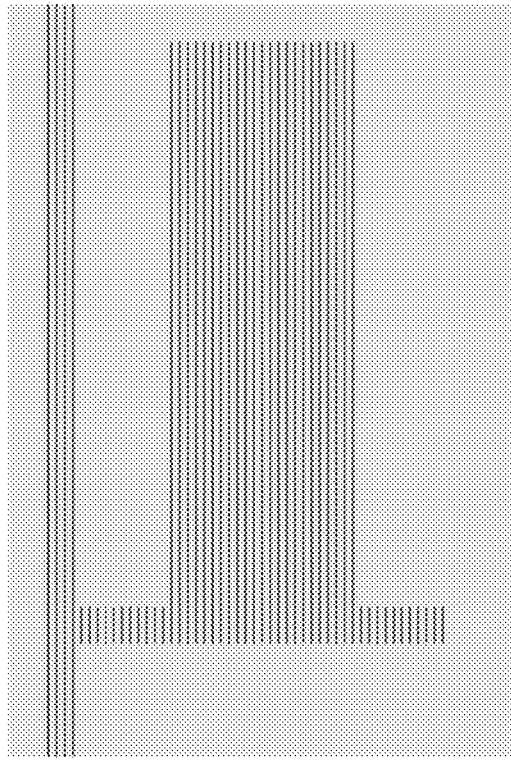
FIG. 12 shows a schematic diagram of a method for preparing light detection film of another embodiment.
Figure 12:
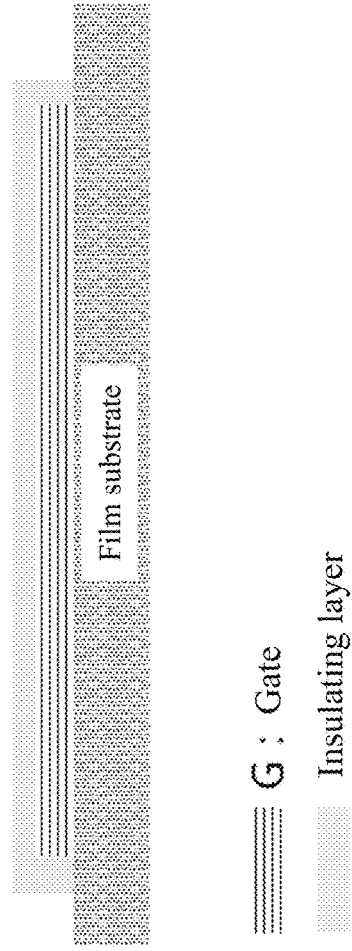
Figure 13:
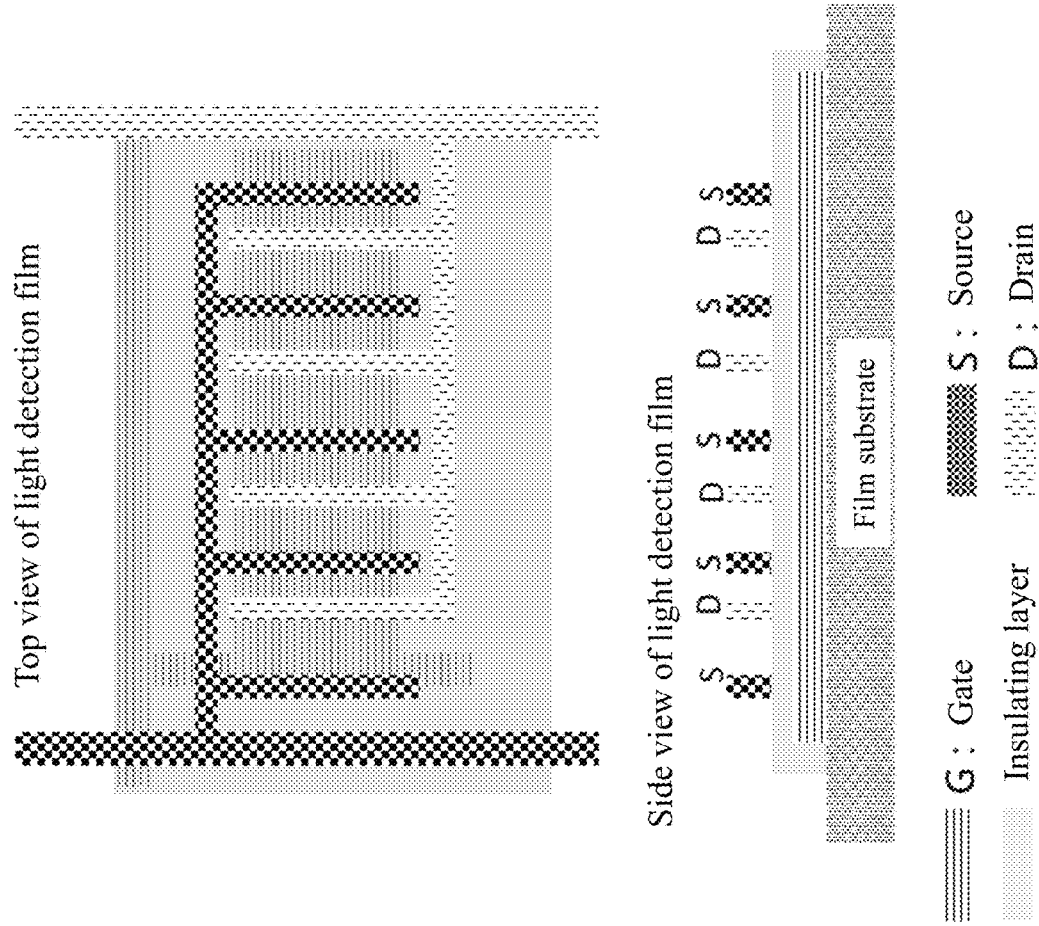
FIG. 13 shows a schematic diagram of a method for preparing light detection film of another embodiment.
Figure 14:
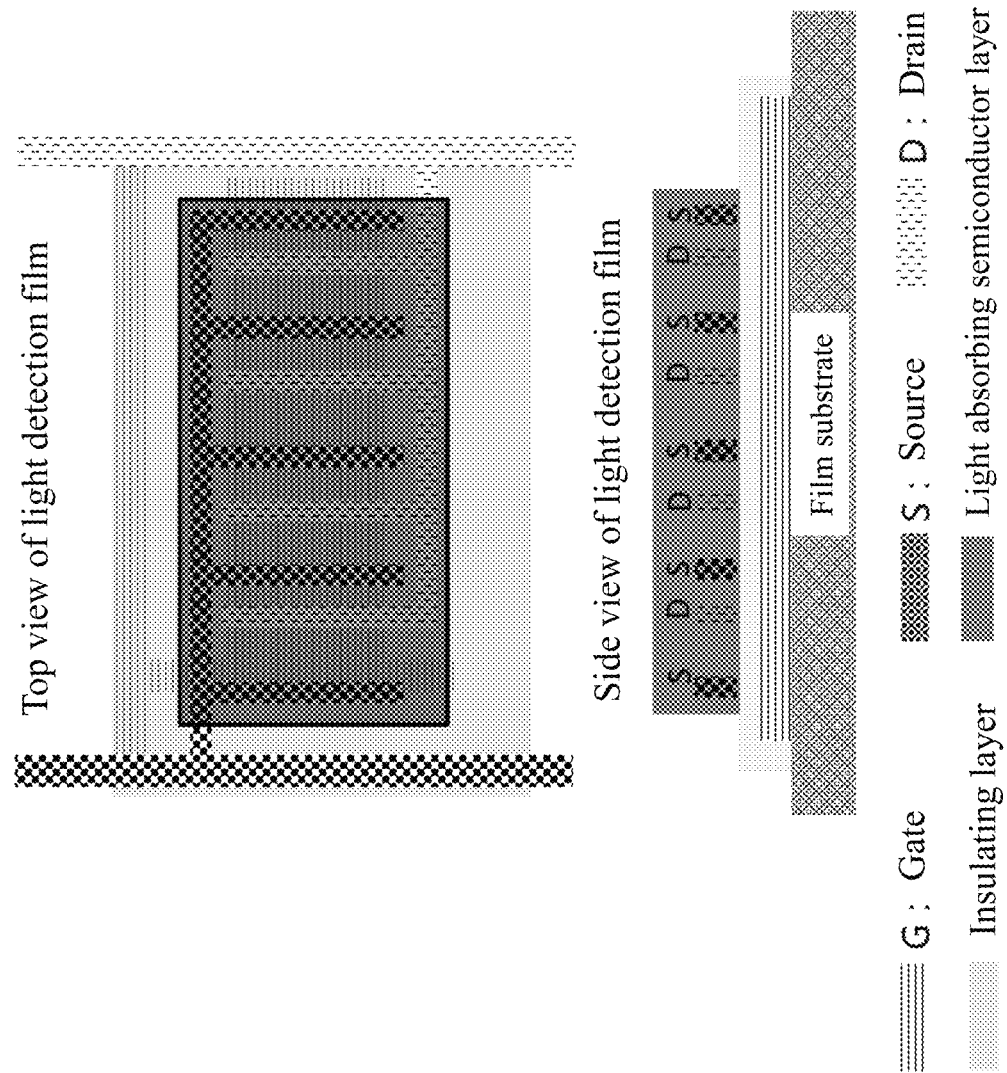
FIG. 14 shows a schematic diagram of a method for preparing light detection film of another embodiment.

As shown in FIG. 10, the number of the source and drain are multiple. The sources are connected in parallel with each other, and the drain are connected in parallel with each other. The source and the drain are isolated by the gap. The photosensitive leakage current channel is formed between the source and drain laterally. The photosensitive leakage current channel includes a first gap formed between adjacent sources, a drain is placed in the first gap and a second gap formed between adjacent drains. The source and drain are staggered and isolated by the gap. The distance between each source and the adjacent drain is less than the electron drift distance. The electron drift distance is a distance that an electron can survive under a field effect. In this way, in each detection pixel, multiple sources belonging to the same pixel are connected in parallel to each other, and multiple drains belonging to the same pixel are also connected in parallel to each other. It can effectively reduce the probability of photo-excited electrons and holes recombining. The probability of the photoelectron being collected by the electrode under the field effect is improved, and the photosensitivity of the TFT leakage current photosensitive film transistor is improved maximumly.

As shown in FIGS. 11 to 14, in order to gradually prepare the process of the photosensitive film transistor (ie, the light detection film) of the seventh embodiment, the general steps are similar to the photosensitive film transistor of the sixth embodiment. The difference is that the "Define a preset structure of the source and drain via the yellow light etching process to obtain source and drain laterally coplanar and isolated by the gap" of the step S803 includes a source group and a drain group are defined by a yellow light etching process when the source and the drain are prepared. Each source group includes multiple sources connected in parallel with each other. A first gap is formed between adjacent sources, a drain is placed in the first gap. A second gap is formed between adjacent drains, and a source is disposed in the second gap. The source and the drain are staggered and isolated by the gap.

In some embodiment, the light detector is configured to receive a detection trigger signal in a light detection state, and receives an optical signal reflected from a user's body part (e.g. fingerprint, eyeball, iris, etc.) to capture user's body part information. The light detector is further configured to receive the detection trigger signal in a state of emitting light source (such as infrared light source). The light source trigger signal and the detection trigger signal alternately switches with a preset frequency. Taking the array formed by the light detector as a photodiode as an example, in the actual application process, the TFT can be used as a scanning to drive a bias voltage (including a forward bias voltage, a zero bias voltage or a negative bias voltage) between the p-type/i-type/n-type photodiode, so that function of TFT image sensing array film emitting infrared light can be achieved.

Specifically, a forward bias a zero bias or a negative bias may be applied between the p-type/i-type/n-type infrared photodiodes alternately to trigger the first trigger signal or the second trigger signal. Taking an array formed by infrared photodiodes with 10 pixel dots as an example, a forward bias is applied to the p-type/i-type/n-type infrared photodiodes during the first period, so that the 10-pixel pixel arrays are all emitting infrared light state. A zero or negative bias is applied to the p-type/i-type/n-type infrared photodiodes in the second period, so that the 10-pixel array is in the infrared light detection state, which is configured to capture the infrared light reflected by the user's eye information and generate corresponding infrared image output. In the third period, a forward bias is applied to the p-type/i-type/n-type infrared photodiodes, so that the 10-pixel pixel arrays are all in the state of emitting infrared light, alternating alternately, and so on. Further, the light source trigger signal (that is, the first trigger signal) and the detection trigger signal (that is, the second trigger signal) are alternately switched, and the switching frequency conforms to a preset frequency. The time interval between adjacent periods can be set according to actual needs. In some embodiment, the time interval can be set to the time required for the infrared photodiode array to receive at least one complete image signal when the TFT array drives and scans each frame, that is, the preset frequency is switched once after the above time interval has passed.

In some embodiments, the body part identification area includes a plurality of body part identification sub-area, and a light detector is correspondingly disposed below each body part identification sub-area. The device further includes a light detector control circuit. The method further includes: the light detector control circuit drives the light detector below the body part identification sub-area after receiving a start command of the body part identification sub-area, and the light detector control circuit shuts down the light detector below the body part identification sub-area after receiving a close command of the body part identification sub-area.

Taking the number of body part identification sub-regions as two as an example, the two body part identification sub-area can be evenly distributed on the screen one by one or one left or right, or they can be distributed on the screen in other arrangements. The application process of a terminal with two body part identification sub-regions is specifically described below: a user-initiated activation signal is received during using, and the light detection devices (that is, the light detector) under the two body part identification sub sub-area are set to the on state. In some embodiment, the range formed by the two body part identification sub-areas coves the entire display screen. It can ensure that when the light detection devices under the two body part identification sub-areas are set to the on state. The light signal can be absorbed by the TFT image sensing array film (ie, the light detector) below to capture the user's fingerprint information.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

I claim:
1. A storage device having an executable computer program stored thereon, and the executable computer program is executed by a processor to perform the steps comprising:
receiving and storing default identification information in an electronic device;

receiving an authentication request and to-be-authorized identification information collected by the electronic device;

acquiring the default identification information from the electronic device;

making a comparison between the to-be-authorized identification information and the default identification information, if they are determined to be matched, the to-be-authorized identification information being true, otherwise the to-be-authorized identification information being false;

converting the default identification information into a default identification information abstract via a cryptographic hash function;

wherein an authentication key is stored in the electronic device and the authentication key comprises a public key, and the computer program is executed, further comprising:

using an encryption algorithm with the public key to encrypt the default identification information abstract in order to obtain default encryption information;

converting the to-be-authorized identification information into to-be-authorized identification information abstract via the cryptographic hash function after receiving the to-be-authorized identification information;

generating randomly a first random number character string and a first random filling space after receiving the default identification information, wherein the default identification information has an encrypted first random number character string and a first random filling space;

generating randomly a second random number character string and a second random filling space after receiving the to-be-authorized identification information, wherein the second random filling space is produced randomly and is filled in characters of the to-be-authorized identification information abstract;

obtaining a private key of the electronic device and using a decryption algorithm with the private key to decrypt the default encryption information in order to obtain the first random number character string and the first random filling space;

setting a plurality of encryption levels of the electronic device, wherein the plurality of encryption levels comprises a first encryption level, a second encryption level and a third encryption level; and making a comparison of the obtained first random number character string with the second random number character string, the obtained first random filling space and the second random filling space, wherein based on an encryption level of the plurality of encryption levels, the to-be-authorized identification information being true when a comparison result is positive, otherwise the to-be-authorized identification information being false, wherein the default identification information and the to-be-authorized identification information comprise physiological characteristics information.

2. The storage device of claim 1, wherein the computer program is executed by the processor, and receiving and storing the default identification information in the electronic device further comprises:

receiving the default identification information collected by an external identification sensor, and writing the default identification information into a universal integrated circuit card of the electronic device, wherein the external identification sensor is independent of the electronic device.

3. The storage device of claim 1, wherein when the computer program is executed by the processor, and receiving and storing the default identification information in the electronic device further comprises:

receiving the default identification information collected by an identification sensor of the electronic device, and writing the default identification information into a universal integrated circuit card of the electronic device.

4. The storage device of claim 1, wherein the default identification information is selected from a group consisting of:

face information, fingerprint information, eyeball information, iris information, voice information, and blood volume information.

5. The storage device of claim 1, wherein, the default identification information is stored as the default identification information abstract in a universal integrated circuit card of the electronic device.

6. The storage device of claim 5, wherein, the computer program is executed by the processor, further comprising:

obtaining the public key, wherein the default encryption information has an encrypted default identification information abstract.

7. The storage device of claim 6, wherein the computer program is executed by the processor, further comprising:

using the encryption algorithm with the public key to encrypt the to-be authorized identification information abstract in order to obtain to-be-authorized encryption information, wherein the to-be-authorized encryption information has encrypted unknown identification information abstract.

8. The storage device of claim 7, wherein the authentication key further comprises the private key and the computer program is executed by the processor, further comprising:

using the decryption algorithm, corresponding to the encryption algorithm, with the private key to decrypt default encryption information and the to-be-authorized encryption information in order to obtain the default identification information abstract and the to-be-authorized identification information abstract; and making a comparison of the default identification information abstract with the to-be-authorized identification information abstract, the to-be-authorized identification information being true when a comparison result is positive, otherwise the to-be-authorized identification information being false.

9. The storage device of claim 1, wherein the computer program is executed by the processor, further comprising:

when the electronic device is in the first encryption level, a condition of a first authorization being true is that of the default identification information matching with the to-be-authorized identification information abstract, the first random number character string matching with the second random number character string, and the first random filling space matching with the second random filling space;

when the electronic device is in the second encryption level, a condition of a second authorization being true is that of the default identification information matching with the to-be-authorized identification information abstract and one of the first random number character string matching with the second random number character string and the first random filling space matching with the second random filling space;

when the electronic device is in the third encryption level, a condition of a third authorization being true is that of the default identification information matching with the to-be-authorized identification information abstract.

10. An electronic device comprises a main circuit board, a processor, a sensing element and the storage device, wherein the default identification information is stored in the main circuit board, the sensing element is connected to the processor, the executable computer program is stored in a storage device, and the processor is configured to execute the computer program; wherein the executable computer program is executed to perform the steps comprising:

receiving and storing the default identification information in the electronic device;

receiving an authentication request and a to-be-authorized identification information collected by the electronic device;

acquiring the default identification information from the electronic device;

making a comparison between the to-be-authorized identification information and the default identification information, if they are determined to be matched, the to-be-authorized identification information being true, otherwise the to-be-authorized identification information being false;

converting the default identification information into a default identification information abstract via a cryptographic hash function;

wherein an authentication key is stored in the electronic device and the authentication key comprises a public key, and the computer program is executed, further comprising:

using an encryption algorithm with the public key to encrypt the default identification information abstract in order to obtain default encryption information;

converting the to-be-authorized identification information into to-be-authorized identification information abstract via the cryptographic hash function after receiving the to-be-authorized identification information;

generating randomly a first random number character string and a first random filling space after receiving the default identification information, wherein the default identification information has an encrypted first random number character string and a first random filling space;

generating randomly a second random number character string and a second random filling space after receiving the to-be-authorized identification information, wherein the second random filling space is produced randomly and is filled in characters of the to-be-authorized identification information abstract;

obtaining a private key of the electronic device and using a decryption algorithm with the private key to decrypt the default encryption information in order to obtain the first random number character string and the first random filling space;

setting a plurality of encryption levels of the electronic device, wherein the plurality of encryption levels comprises a first encryption level, a second encryption level and a third encryption level; and making a comparison of the obtained first random number character string with the second random number character string, the obtained first random filling space and the second random filling space, wherein based on an encryption level of the plurality of encryption levels, the to-be-authorized identification information being true when a comparison result is positive, otherwise the to-be-authorized identification information being false, wherein the default identification information and the to-be-authorized identification information comprise physiological characteristics information.

11. The electronic device of claim 10, wherein the sensing element is selected from a group consisting of:
a regular camera, an infrared camera and a microphone.

12. The electronic device of claim 10, wherein
the computer program is executed by the processor to perform the steps comprising:
receiving different types of the default identification information from by the sensing element, converting the different types of the default identification information into different types of corresponding default identification information abstracts via the cryptographic hash function.

13. The electronic device of claim 10, further comprising a display unit.

14. The electronic device of claim 13, further comprising a flexible circuit board, which has a chip with an image signal reading identification function, wherein the display unit is connected to the main circuit board via the flexible circuit board.

15. The electronic device of claim 13, wherein a universal integrated circuit card is disposed on the main circuit board.

16. The electronic device of claim 13, wherein the display unit comprises a plurality of pixel array assemblies, and the computer program is executed by the processor to perform the steps comprising:
coding the plurality of default pixel array assemblies on the display unit, and
using the coded pixel array assemblies to irradiate a body part; and
receiving an optical signal reflected from the body part to obtain the default identification information.

17. The electronic device of claim 13, wherein the sensing element is a light detector, an identification area is disposed on the display unit, and the light detector and the identification area are disposed correspondingly, the light detector comprises a plurality of pixel detection areas, each pixel detection area is disposed correspondingly with a set of a pixel film circuit and a light detection film composed by at least one thin film transistor, and the set of the pixel film circuit and the light detection film is configured to drive scanning and transmit data, wherein the light detection film comprises an array that is formed from a group consisting of: a plurality of photodiodes and a plurality of phototransistors.

* * * * *